United States Patent
Brough

(10) Patent No.: US 6,937,819 B2
(45) Date of Patent: Aug. 30, 2005

(54) OPTICAL VIEWING SYSTEM AND ADAPTOR THEREFOR

(76) Inventor: Richard Brough, 3171 Quaint Ranch St., Logandale, NV (US) 89021

(*) Notice: Subject to any disclaimer, the term of this patent is extended or adjusted under 35 U.S.C. 154(b) by 0 days.

(21) Appl. No.: 10/947,026

(22) Filed: Sep. 22, 2004

(65) Prior Publication Data

US 2005/0062873 A1 Mar. 24, 2005

Related U.S. Application Data

(60) Provisional application No. 60/505,319, filed on Sep. 23, 2003.

(51) Int. Cl.$^7$ .......................... G03B 17/12; G03B 41/00
(52) U.S. Cl. ...................... 396/429; 396/530; 396/544; 348/217.1; 348/375; 250/214 VT
(58) Field of Search ........................ 396/71, 429, 530, 396/544; 348/217.1, 360, 373–376

(56) References Cited

U.S. PATENT DOCUMENTS

| | | | |
|---|---|---|---|
| 2,946,255 A | 7/1960 | Bolay | 250/330 |
| 3,464,757 A | 9/1969 | Schmidt | 359/353 |
| 3,529,882 A | 9/1970 | Schmidt | 359/353 |
| 3,545,356 A | 12/1970 | Nielsen | 396/426 |
| 3,785,261 A | 1/1974 | Ganteaume | 396/426 |
| 3,911,451 A | 10/1975 | Vockenhuber | 396/426 |
| 3,968,504 A * | 7/1976 | Komine | 396/71 |
| 4,067,045 A * | 1/1978 | Provost et al. | 348/217.1 |
| 4,161,835 A | 7/1979 | Lough | 42/114 |
| 4,309,095 A | 1/1982 | Buckley | 396/420 |
| 4,524,675 A | 6/1985 | Durenec et al. | 89/41.06 |
| 4,835,621 A | 5/1989 | Black | 386/118 |
| 4,884,137 A | 11/1989 | Hanson et al. | 348/158 |
| 5,020,262 A | 6/1991 | Pena | 42/106 |
| 5,040,885 A | 8/1991 | Simms | 359/399 |
| 5,130,527 A | 7/1992 | Gramer et al. | 250/214 VT |
| 5,140,151 A | 8/1992 | Weiner et al. | 359/210 |
| 5,157,548 A | 10/1992 | Monnier et al. | 359/630 |
| 5,272,514 A | 12/1993 | Dor | 356/251 |
| 5,299,067 A | 3/1994 | Kutz et al. | 359/827 |
| 5,434,704 A | 7/1995 | Connors et al. | 359/403 |
| 5,444,507 A | 8/1995 | Palmer | 396/421 |
| 5,528,418 A | 6/1996 | Bowman, Jr. | 359/400 |
| 5,564,817 A * | 10/1996 | Palmer | 362/191 |
| 5,745,170 A * | 4/1998 | Palmer | 348/217.1 |
| 5,828,166 A | 10/1998 | Roselli et al. | 313/365 |
| 5,887,375 A | 3/1999 | Watson | 42/106 |
| 5,937,562 A | 8/1999 | Brough | 42/119 |
| 6,094,304 A | 7/2000 | Wallace et al. | 359/425 |
| 6,326,604 B1 * | 12/2001 | Collins | 250/214 VT |
| 6,449,419 B1 | 9/2002 | Brough et al. | 385/136 |

* cited by examiner

Primary Examiner—W. B. Perkey
(74) Attorney, Agent, or Firm—Alvin R. Wirthlin

(57) ABSTRACT

An optical viewing system includes first, second and third image modifying devices together with an adaptor assembly for connecting the image modifying devices together. The adaptor assembly has first and second clamping portions. The first clamping portion is connected to the first and second image modifying devices and the second clamping portion is connected to the first clamping portion and to the first and third image modifying device so that the first image modifying device is clamped between the second and third image modifying devices. At least one of the first and second clamping portions are removably connected to the first image modifying device so that the first image modifying device can be removed from the adaptor assembly and operate as a further independent optical viewing system. Different combinations of image modifying devices can be arranged with one or more of the clamping portions.

25 Claims, 12 Drawing Sheets

OPTICAL VIEWING SYSTEM AND ADAPTOR THEREFOR

CROSS-REFERENCE TO RELATED APPLICATIONS

This application claims the benefit of U.S. Provisional Application No. 60/505,319 filed on Sep. 23, 2003, the disclosure of which is hereby incorporated by reference in its entirety.

BACKGROUND OF THE INVENTION

This invention relates to optical devices, and more particularly to an optical assembly and system for transferring image information from one image modifying device to another image modifying device.

It is often necessary to either replace or modify optical assemblies, such as firearm day scopes or the like, when lighting or atmospheric conditions change. The replacement of a night vision scope for a day scope often requires dismounting the day scope from the firearm, then mounting and sighting in the night vision scope. This is a time-consuming and labor-intensive task, and is particularly disadvantageous during combat or other life-threatening situations.

A weapon sight provided by ITT Industries as the F7200/F7201 ITT Modular requires a user to interchange a day eyepiece assembly with a night eyepiece assembly in order to use the weapon sight at night. The night eyepiece assembly includes an image intensifier. The conversion of the weapon from day-time use to night-time use and conversely, is time consuming because one eyepiece assembly must be removed before the other eyepiece assembly is mounted. Furthermore, the night eyepiece assembly cannot be used for any other purpose (e.g., it cannot be used alone as a night vision monocular). Moreover, since the optical parts of an optical assembly are typically maintained in a controlled atmosphere within a housing, each separation affects the reliability and operation of the optical assembly.

Another problem in the prior art is the inability to easily and quickly modify existing optical equipment by connecting together different image modifying devices to thereby increase the usefulness of such equipment. By way of example, U.S. Pat. No. 5,828,166 issued to Roselli et al. discloses a device to record still or moving images as viewed through an image intensifying device. The system includes an image intensifier for intensifying an image at lower light levels, a backbody adaptor mounted between a rear end of the image intensifier and the body of a camera, and a front lens adaptor mounted between the front end of the image intensifier and an electronic objective lens. All of the components are both mechanically and electrically connected together so that the camera body powers both the image intensifier and the electronic objective lens. Although this system may be advantageous when it is desirous to eliminate the separate source of power and on/off switch normally associated with stand-alone image intensifiers, self-powered image intensifiers cannot be used in this system, nor can this system be adapted for non-electronic type objective lenses or cameras. Moreover, the image intensifier of this system cannot operate as a stand-alone unit since it depends on the camera body for its source of power. Accordingly, this system is not readily adaptable to different viewing systems and image modifying components.

Thus, there is a need in the art for a system that easily and quickly connects different components together to create various combinations of image modifying devices to thereby increase the effectiveness and usefulness of the image modifying devices.

There is a further need in the art for an optical viewing assembly that can be modified in a relatively quick and easy manner to accommodate a wide variety of needs of different users in varying image viewing and/or recording situations.

BRIEF SUMMARY OF THE INVENTION

In accordance with one aspect of the present invention, an adaptor assembly for connecting electrically powered image modifying devices together comprises a first image modifying device and first and second clamping portions. The first clamping portion has a first electrical connector for mechanical and electrical connection to a second electrically operated image modifying device. The second clamping portion has a second electrical connector for mechanical and electrical connection to a third electrically operated image modifying device. The second clamping portion is adapted for mechanical and electrical connection to the first clamping portion so that the second and third image modifying devices will be in electrical communication when connected to the first and second clamping portions, respectively. The first image modifying device is electrically isolated from the first and second electrical connectors. At least one of the first and second clamping portions is removably connected to the first image modifying device so that the first image modifying device can be removed from the adaptor assembly and operate as an independent optical viewing system.

In accordance with a further aspect of the present invention, an optical viewing system comprises first, second and third image modifying devices together with an adaptor assembly for connecting the image modifying devices together. The second image modifying device is positioned rearwardly of the first image modifying device and the third image modifying device is positioned forwardly of the first image modifying device. The adaptor assembly includes first and second clamping portions. The first clamping portion is connected to the second image modifying device and the second clamping portion is connected to the first clamping portion and to the third image modifying device so that the first image modifying device is clamped between the second and third image modifying devices. At least one of the first and second clamping portions are removably connected to the first image modifying device so that the first image modifying device can be removed from the adaptor assembly and operate as a further independent optical viewing system.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein.

It is noted that the drawings are intended to depict only typical embodiments of the invention and therefore should not be considered as limiting the scope thereof. The invention will now be described in greater detail with reference to the accompanying drawings.

DETAILED DESCRIPTION OF THE INVENTION

Figure 1:
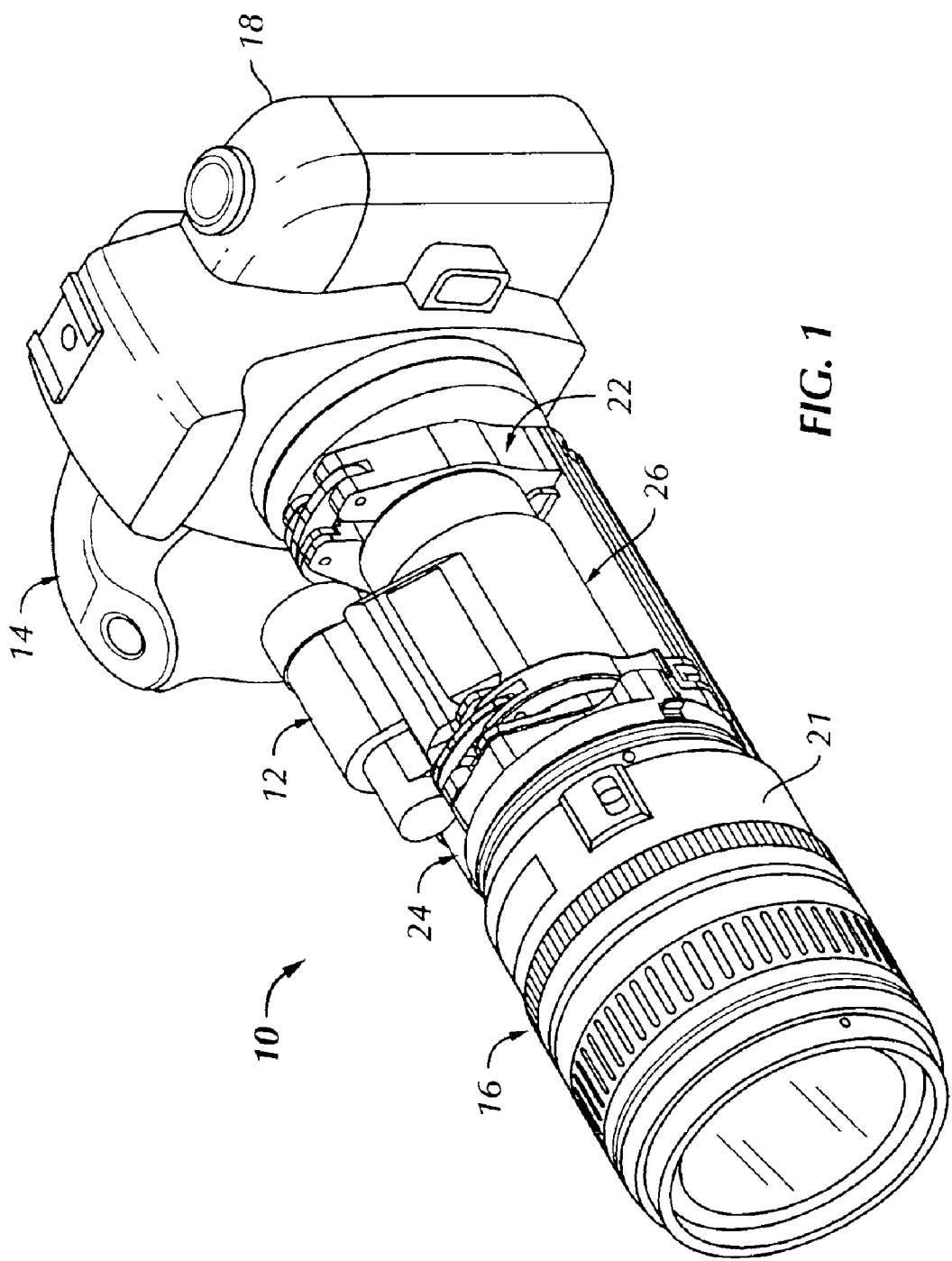
FIG. 1 is a front perspective view of an optical viewing system in accordance with the present invention.
Figure 2:
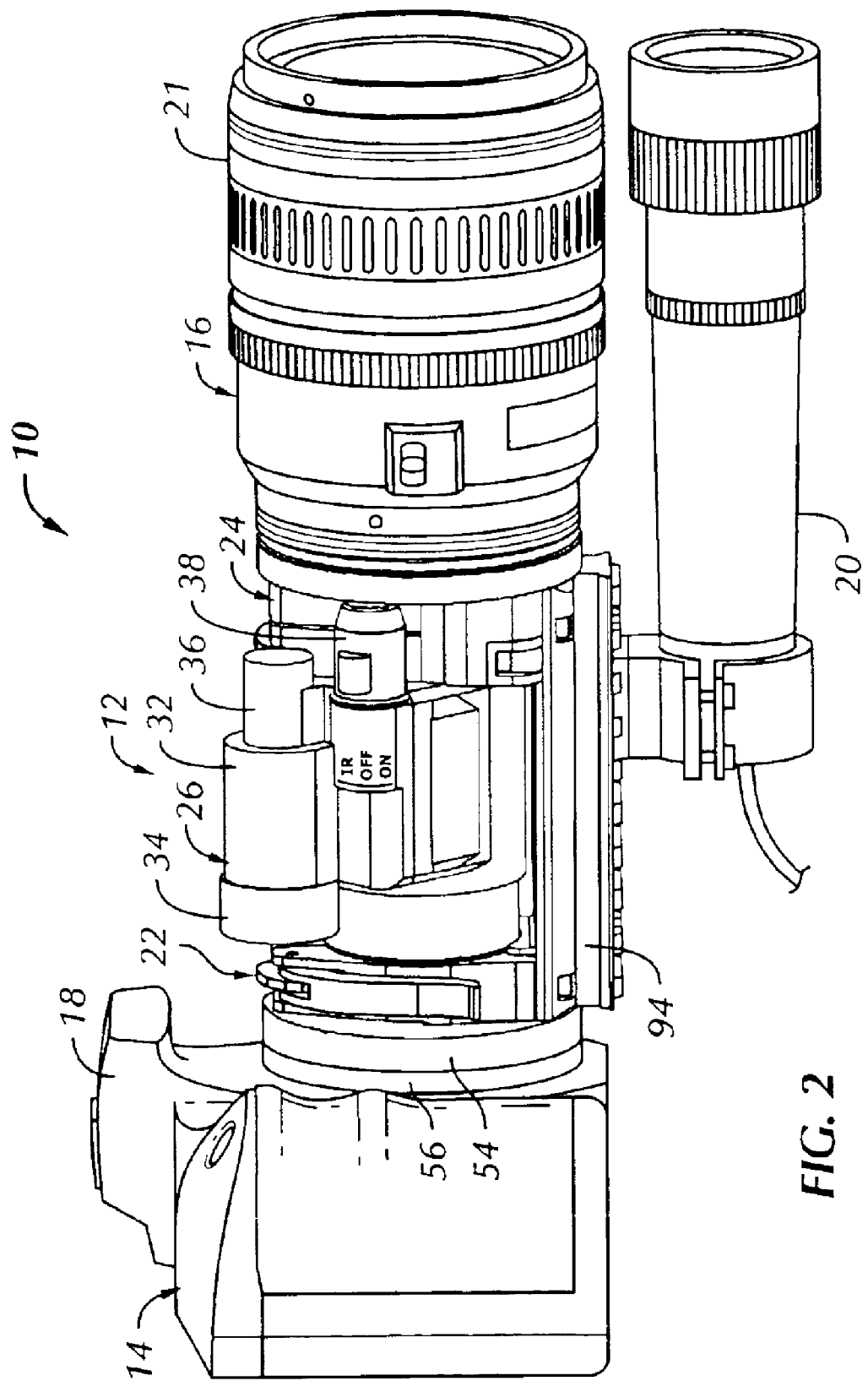
FIG. 2 is a side perspective view of the optical viewing system of FIG. 1 with an added viewing accessory.
Figure 3:
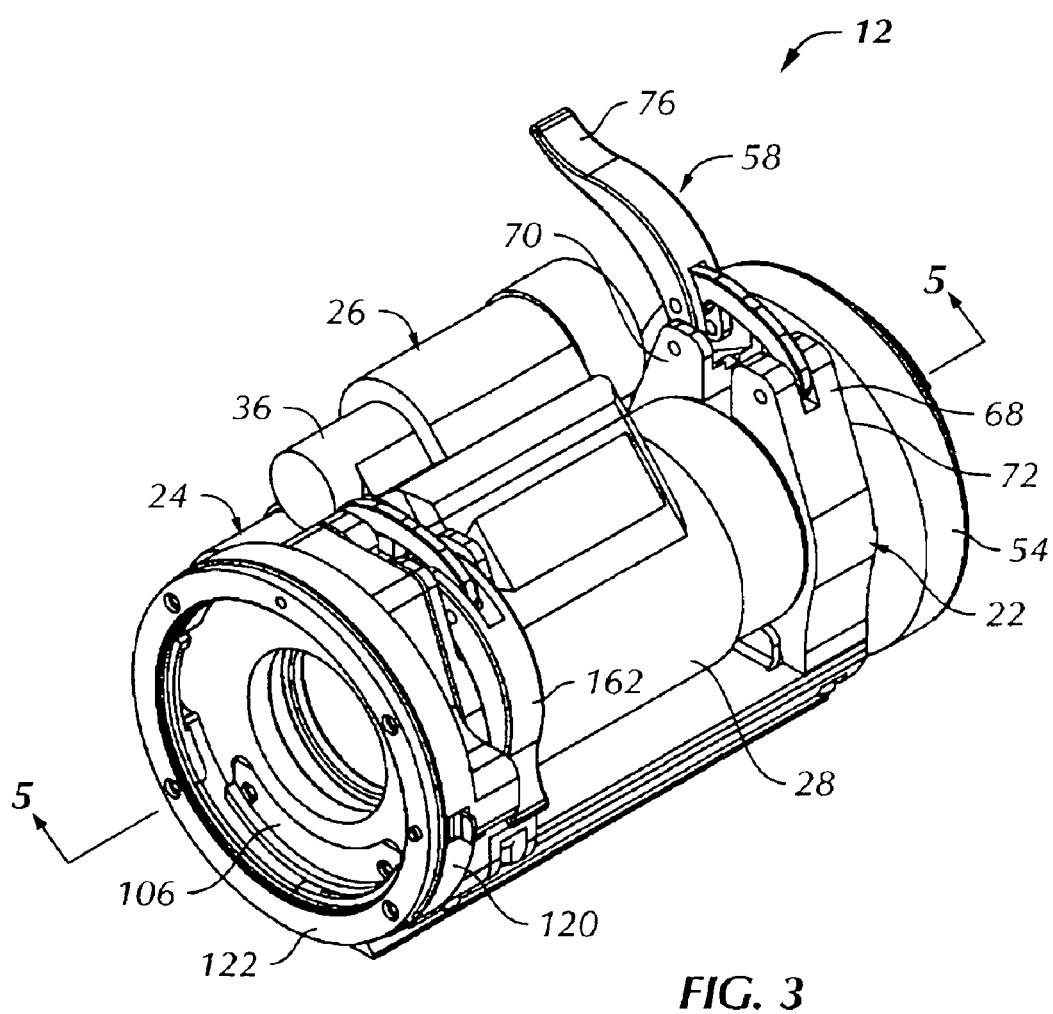
FIG. 3 is a front perspective view of an adaptor assembly that forms part of the optical viewing system of FIG. 1.

Referring to the drawings, and to FIGS. 1 and 2 in particular, an optical viewing system 10 in accordance with an exemplary embodiment of the present invention is illustrated. The optical viewing system 10 includes an adaptor assembly 12 with a first image modifying device 26 mounted between a second image modifying device 14 and a third image modifying device 16. In accordance with an exemplary embodiment of the invention, the first image modifying device 26 can be in the form of a night vision monocular, the second image modifying device 14 can be in the form of an image recording device 18, such as an electronic still camera, and the third image modifying device 16 can be in the form of an electronic objective lens 21 that can be directly connected, both mechanically and electrically, to the camera.

By way of example, the image recording device 18 may be a well-known Canon D60 EOS and the objective lens 21 may be a Canon EF 28–105mm lens or 100–400 mm telephoto lens. However, it will be appreciated that the camera and/or objective lens can be of the non-electronic type. It will be further appreciated that the optical viewing system 10 is not limited to still film-type or digital cameras, but may also or alternatively comprise other image recording devices such as analog or digital video cameras, as well as non-image recording devices such as eyepieces and other lenses, fiber optic viewers, and so on.

Accordingly, the term "image modifying device" as used herein refers to any device or assembly that alters an image as perceived by the naked eye, e.g. that changes the apparent brightness, intensity, magnification, color, and/or field of view of an image, and/or that modifies an image through recording, transmitting, encoding, and so on. Such image modifying devices may include, but are not limited to, filters, one or more lenses, rifle or gun scopes, spotting scopes, telescopes, binoculars, laser rangefinders, mortar sights, anti-tank sights, bow sights, surveying transits, night vision monoculars or binoculars including image intensifying and thermal imaging devices, infrared cameras, image pickup devices, gyro-stabilized and digitally stabilized optics, film-type cameras, devices that transform an image into electrical signals such as still or video cameras of the digital or analog type, image recording devices, image pick-up heads, flying spot scanners, and so on.

An image modifying device, such as an accessory 20 (FIG. 2) can be mounted to the adaptor assembly 12 to aid in illuminating or targeting a distant object. The accessory 20 can be in the form of a flashlight, infrared projector, laser aiming device, and so on.

With additional reference to FIGS. 3–9, the adaptor assembly 12 includes a rear clamping portion 22 adapted for connection to the second image modifying device or camera 14, a front clamping portion 24 adapted for connection to the third image modifying device or objective lens 16. The adaptor assembly also includes the first image modifying device 26 that is adapted for connection to the rear clamping portion 22 and front clamping portion 24. Preferably, the first image modifying device 26 comprises at least a portion of a night vision monocular.

The night vision monocular 26 is of well-known construction and enables the viewing or clarification of objects under low light conditions that normally cannot be seen or discerned by the naked eye. The monocular 26 can include known technologies such as low light magnification, thermal imaging, infrared illumination, and so on. In accordance with an exemplary embodiment of the invention, the monocular 26 includes a housing 28 and an image intensifier tube 30 (FIG. 5) positioned within the housing. The monocular 26 is preferably of the self-powered type and thus includes a battery (not shown) located within a battery compartment 32 for powering the image intensifier tube 30. A removable cap 34 is associated with the battery compartment 32 for accessing the battery when replacement is needed. The monocular 26 may also include an infrared illuminator 36 for providing additional lighting to distant objects and a three-position switch 38 for selecting between "ON", "OFF", and "IR" illumination states (FIG. 2). The image intensifier tube 30 of the night vision monocular 26 can comprise a standard 18 mm ANVIS standard format image, such as the PVS14 by ITT Industries. Operation of the night vision monocular is well known and therefore will not be further described.

Figure 5:
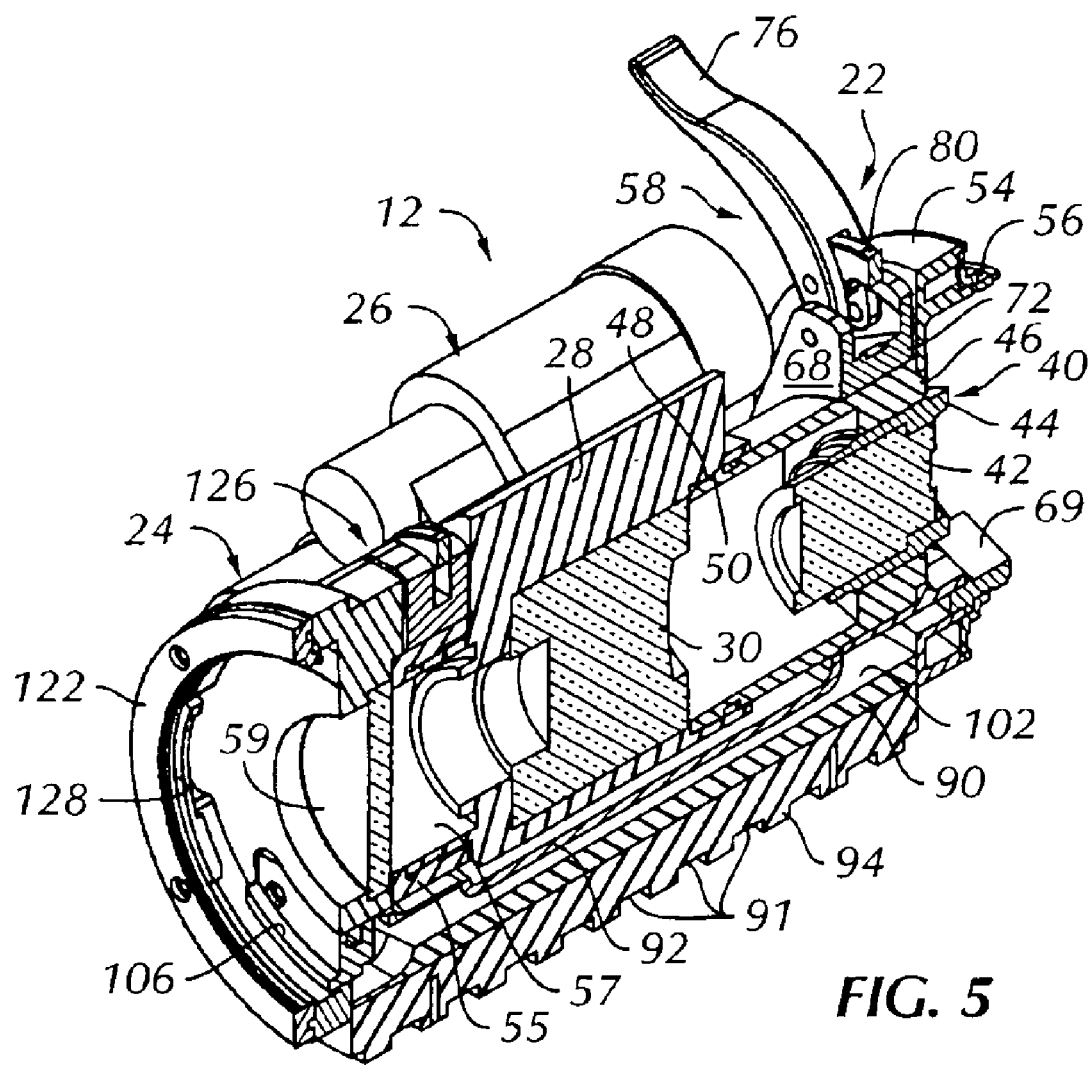
FIG. 5 is a longitudinal sectional perspective view of the adaptor assembly taken along line 5—5 of FIG. 3.
Figure 9:
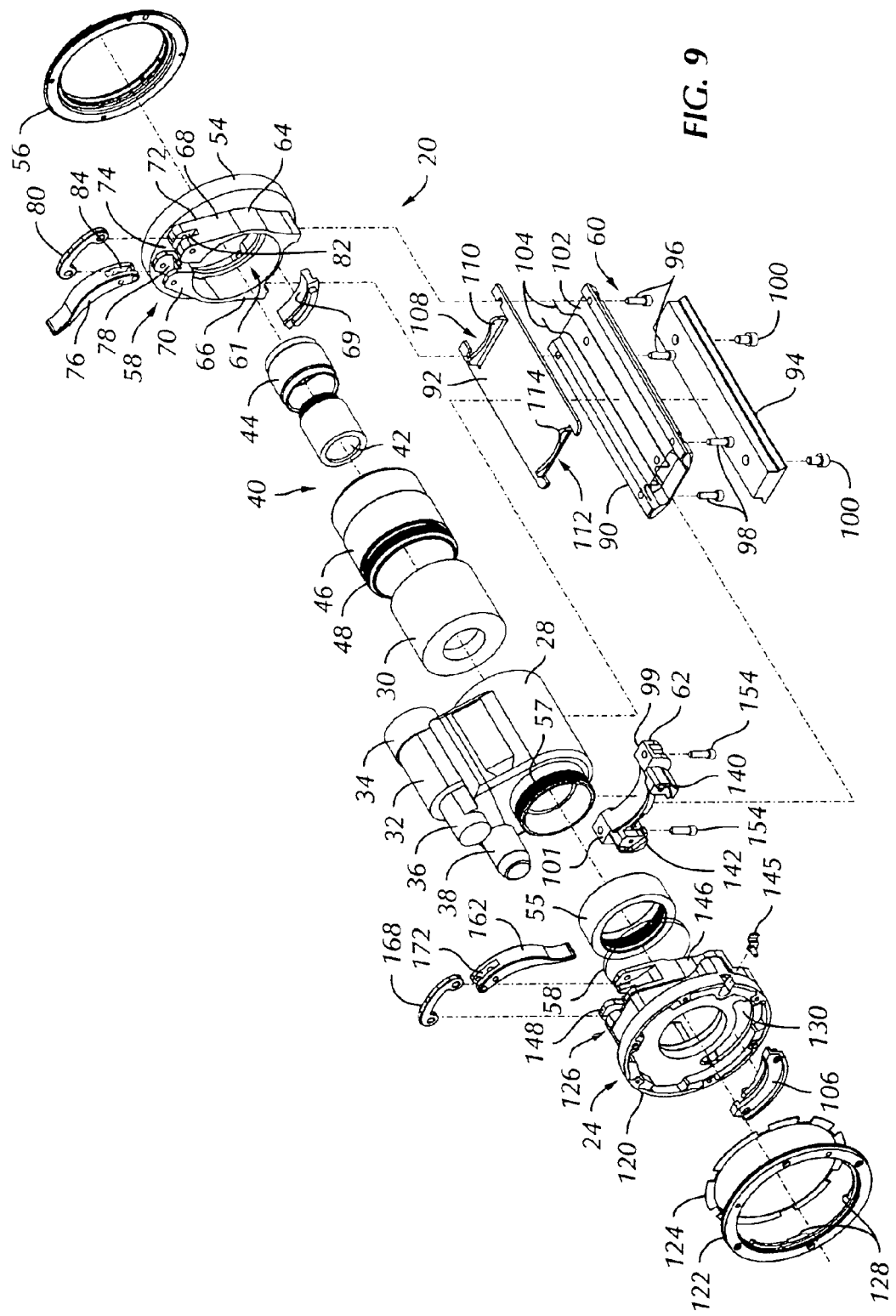
FIG. 9 is an exploded front perspective view of the adaptor assembly showing the details of the components.

As best shown in FIGS. 5 and 9, in order to optically mate the optical output of the monocular 26 with the camera 14 or other image modifying device, a removable rear relay lens assembly 40 is removably connectable to a rear portion of the monocular 26 behind the image intensifier tube 30. The rear relay lens assembly 40 includes a generally cylindrical lens 42 positioned in a lens sleeve 44 which is in turn positioned in an adaptor sleeve 46. The adaptor sleeve 46 has external threads 48 that mate with internal threads 50 of the monocular housing 28. The lens 42 can be mounted in the lens sleeve through mutually engageable threads as shown, or through one or more set screws (not shown) that extends through the lens sleeve and into a groove (not shown) on the lens. Other mounting means may include adhesives, glass to metal bonding, or other well known mounting means. The lens 42 has a predetermined focal length and is positioned at a predetermined distance from the image intensifier tube 30 to maximize the viewable image through the tube 30 as viewed or recorded at the second image modifying device 14.

Figure 12:
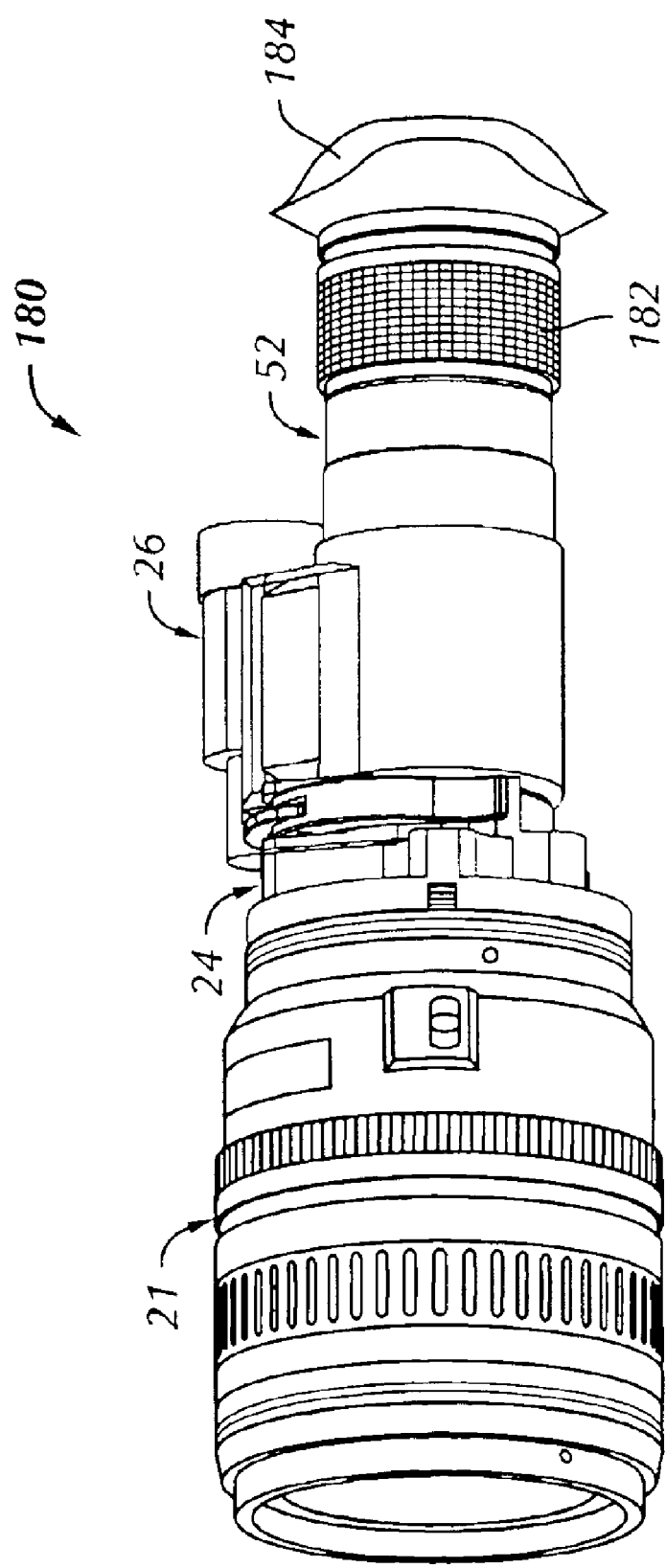
FIG. 12 is a side perspective view of an optical viewing system in accordance with a further embodiment of the invention.
Figure 13:
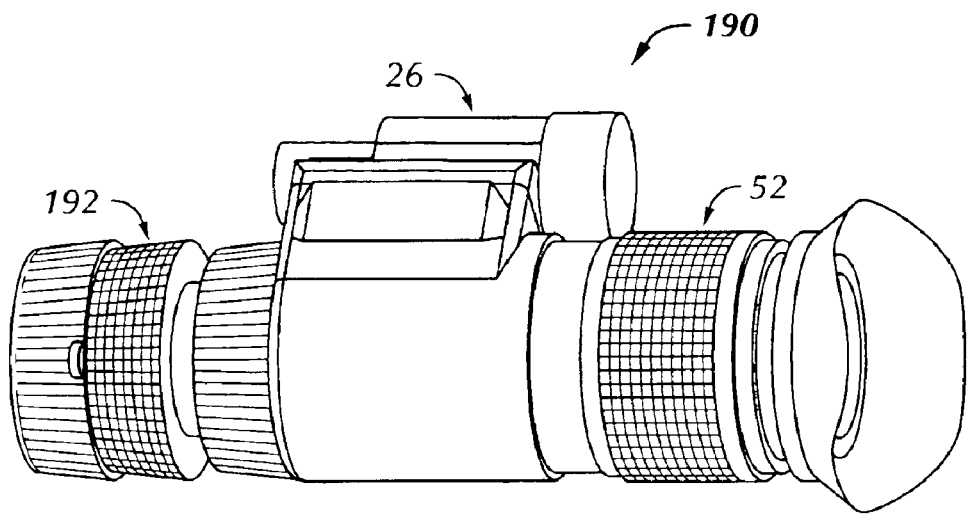
FIG. 13 is a side perspective view of an optical viewing system in accordance with a further embodiment of the invention that can be configured when the clamping components of the invention are removed.

When the second image modifying device is not used, such as when it is desirable to use the night vision monocular 26 as a stand-alone unit, the entire relay lens assembly 40 can be unscrewed or otherwise removed from the housing 28 and replaced with a suitable eyepiece 52 as shown in FIGS. 12 and 13, as will be described in greater detail below.

In accordance with the present invention, the image intensifier tube 30 can easily be changed or upgraded in the field by first removing the relay lens assembly 40 and then the image intensifier tube 30 before inserting a new image intensifier tube in its place.

A removable front lens adaptor 55 is preferably connected to a forward protrusion 57 of the monocular housing 28 through mutually engageable threads or the like. A flat lens or window 59 is mounted adjacent the front lens adaptor 55 to protect the image intensifier tube 30 from foreign particles when the unit is disassembled. The front lens adaptor 55 can be removed depending on the particular image modifying device that will be used.

With particular reference to FIGS. 4–10, the rear clamping portion 22 includes a rear support ring 54, a rear mounting ring 56 connected to the rear support ring for mounting to the second image modifying device, a quick release rear clamp assembly 58 connected to the rear support ring 54, a wire tray assembly 60 connected to a lower end of the rear clamp assembly 58, and a front clamp lower segment 62 adapted for connection with the front clamping portion 24.

Figure 4:
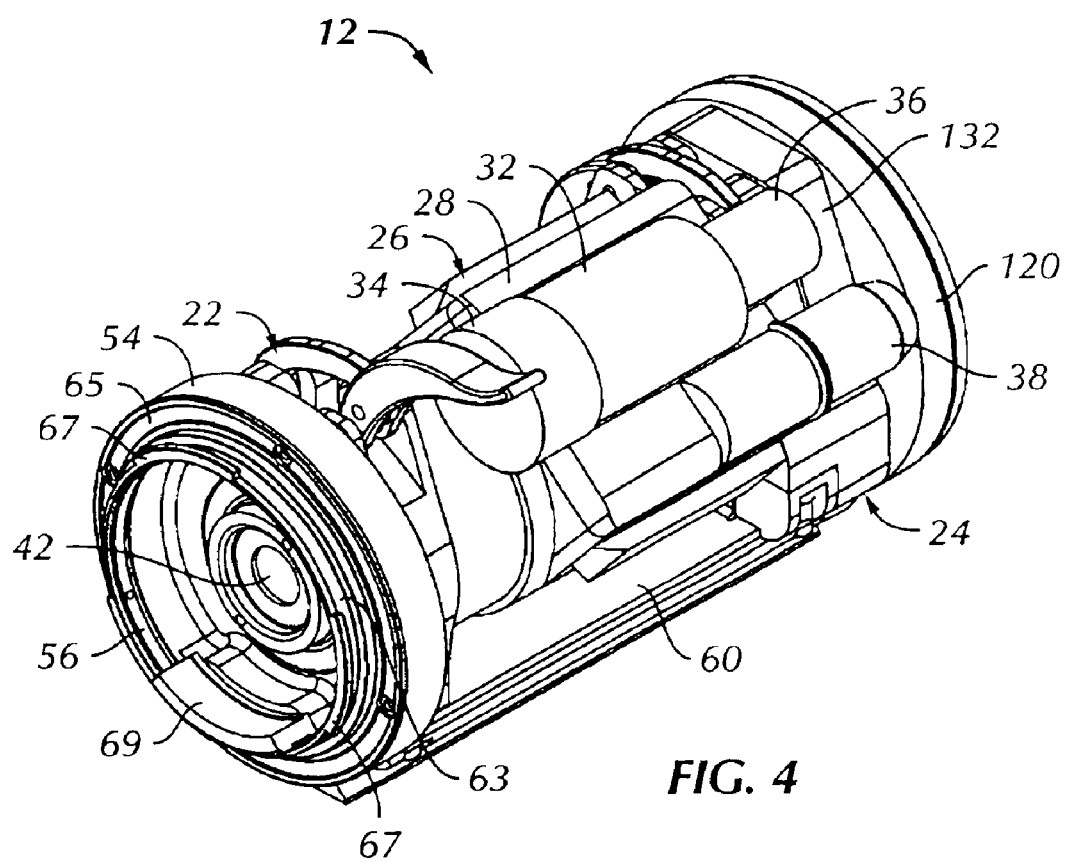
FIG. 4 is a rear perspective view of the adaptor assembly.

The rear mounting ring 56, as best shown in FIG. 4, includes an annular axially extending portion 63, a flange portion 65 that extends radially outwardly from a forward end of the annular portion, and tabs 67 that extend radially outwardly from a rear end of the annular portion. The flange portion 65 is preferably fastened to the rear support ring 54 through threaded screws or the like. It will be appreciated however, that other mounting means can be used. The tabs 67 are adapted to engage with corresponding tabs or supports (not shown) in the lens mounting opening (not shown) of the image recording device 18 (FIG. 1), such as the Canon D60 EOS or the like as previously described. A rear electrical connector module 69 (shown in block form) is positioned in an opening 71 (FIG. 10) of the rear support ring 54 for mating with a corresponding connector module (not shown) associated with the lens mounting opening of the recording device 18. The electrical connector module 69 may include electrical contacts (not shown) in the form of one or more pins, receptacles, contact pads, and so on.

It will be understood that the rear mounting ring 56 may have a wide variety of different configurations to accommodate other mounting means when other image modifying devices are to be used. Such mounting means may include, but are not limited to, external or internal threads, clamps, fasteners, interlocking elements, and so on. It will be appreciated that the rear mounting ring 56 may be eliminated or removed, depending on the particular configuration of the second image modifying device 14.

Figure 10:
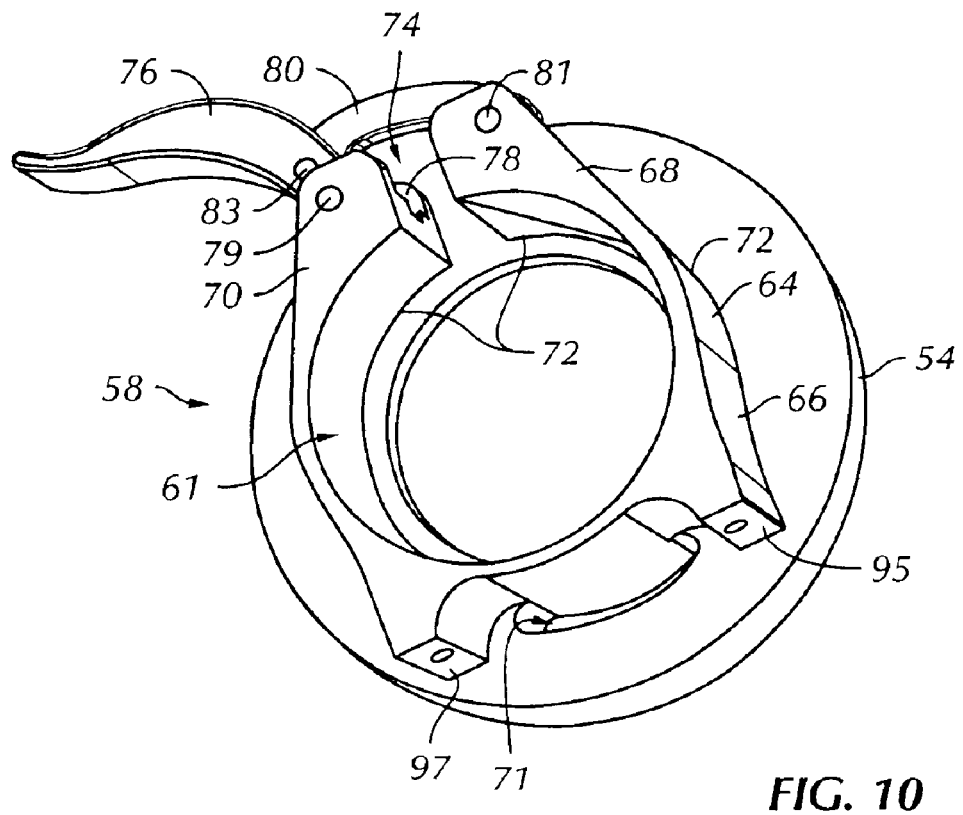
FIG. 10 is an enlarged front perspective view of a rear clamp assembly that forms part of the optical viewing system of FIG. 1.

As best shown in FIGS. 9 and 10, the rear clamp assembly 58 includes a split collar 64 with a lower circular section 66 that is preferably integrally formed with the lower end of the rear support ring 54. The split collar 64 defines a generally circular opening 61 that receives the adaptor sleeve 46 of the rear relay lens assembly 40 (see also FIG. 5). A pair of spaced clamping legs 68, 70 extend upwardly from the lower circular section 66 and are separated from the rear support ring 54 by a pair of slots 72. A space 74 between the legs 68, 70 accommodates relative leg movement between clamped and unclamped positions. A locking lever 76 is pivotally connected to the leg 70 in a channel 78. In a preferred arrangement, a roll pin 79 extends through bores formed in the leg 70 and a bore formed in the locking lever 76. A link arm 80 has a first end that is pivotally connected to the leg 68 in a groove 82 (FIG. 9) and a second end that is pivotally connected to the locking lever 76 in a groove 84 formed in the locking lever. In a preferred arrangement, the link arm first end pivots about a second roll pin 81 that extends through and frictionally engages bores formed in the leg 68. The link arm second end pivots about a third roll pin 83 that extends through and frictionally engages bores formed in the locking lever 76.

In use, the locking lever 76 is initially in an open position (FIG. 7) prior to mounting the rear clamping portion 22 to the first image modifying device. An elastomeric bushing (not shown) may be positioned in the opening 61 or mounted on the image modifying device, such as the adaptor sleeve 46 of the rear relay lens assembly 40, prior to installing the rear clamping portion 22 on the image modifying device. Once the image modifying device is received in the rear clamping portion 22, the locking lever 76 is rotated clockwise (as viewed in FIGS. 4 and 6–8). Rotation of the locking lever in this manner causes the link arm 80 to pull the clamping legs 68 and 70 toward each other and reduce the size of the gap 74 and the diameter of the opening 61. When the locking lever passes an over-center position, it will snap toward an outer surface of the split collar 64. In this position, the clamping legs 68, 70 are locked in a clamped or closed position with the adaptor sleeve 46 securely held therein.

The size of the opening 61 and the bushing, if needed, can be adjusted to accommodate a variety of different image modifying devices. Further details of the rear clamp assembly 58, as well as its method of operation, can be found in U.S. Pat. No. 6,449,419 issued to Brough et al. on Sep. 10, 2002, the disclosure of which is hereby incorporated by reference.

As best shown in FIG. 9, the wire tray assembly 60 includes a support base 90, a cover 92 connected to an upper side of the support base, and an accessory mounting bar 94 connected to a lower side of the support base. Rear portions of the support base 90 and cover 92 are connected to lower mounting legs 95, 97 (FIG. 10) of the clamping device 58 through bolts 96, while front portions of the support base and cover are connected to the front clamp lower segment 62 through bolts 98. Likewise, the accessory mounting bar 94 is connected to the support base 90 through bolts 100. The accessory mounting bar 94 includes a plurality of parallel slots 91 for mounting various image modifying accessories 20 (FIG. 1), as previously described, in a well-known manner.

Figure 6:
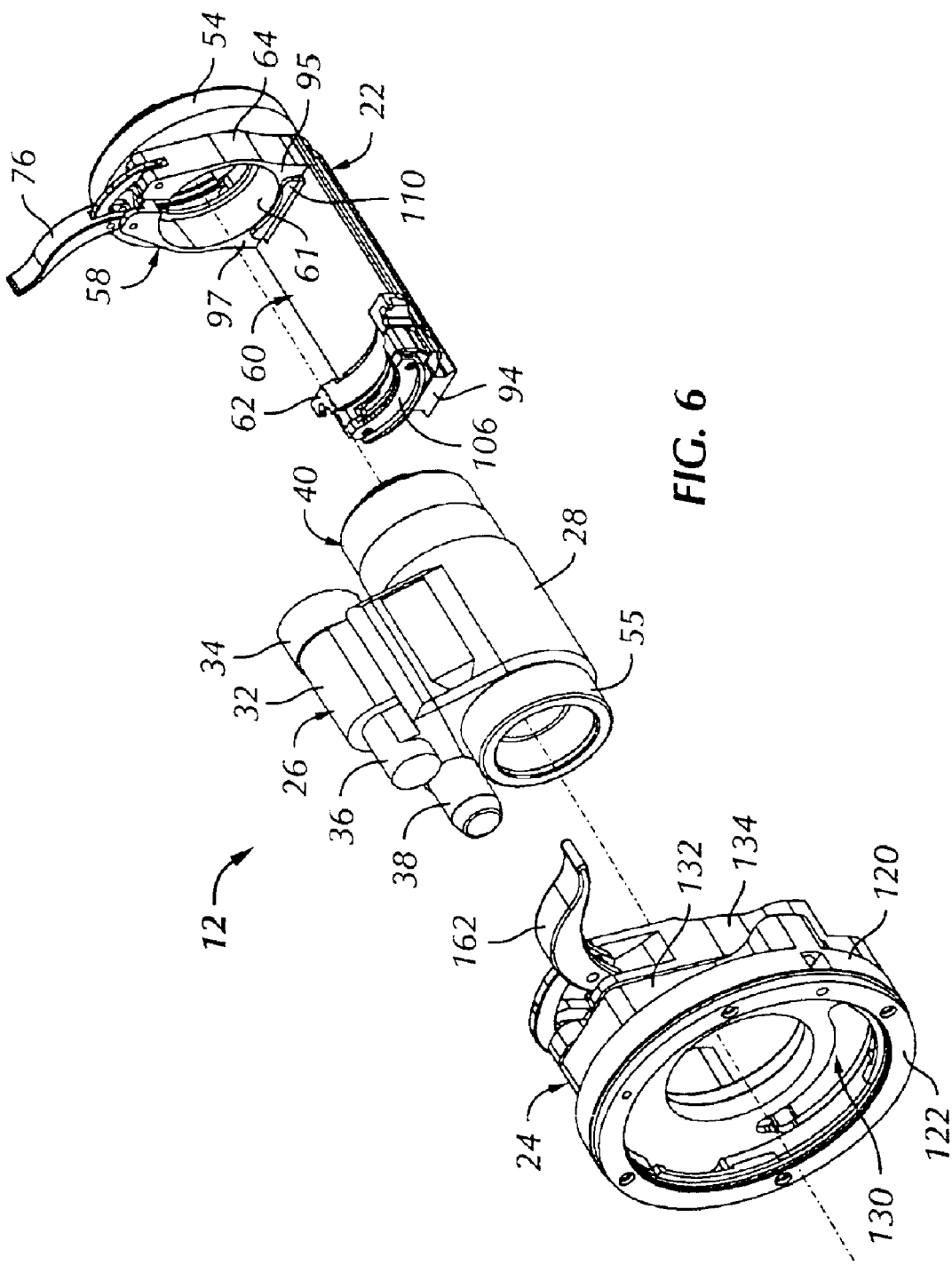
FIG. 6 is a partially exploded front perspective view of the adaptor assembly illustrating the main components thereof.
Figure 7:
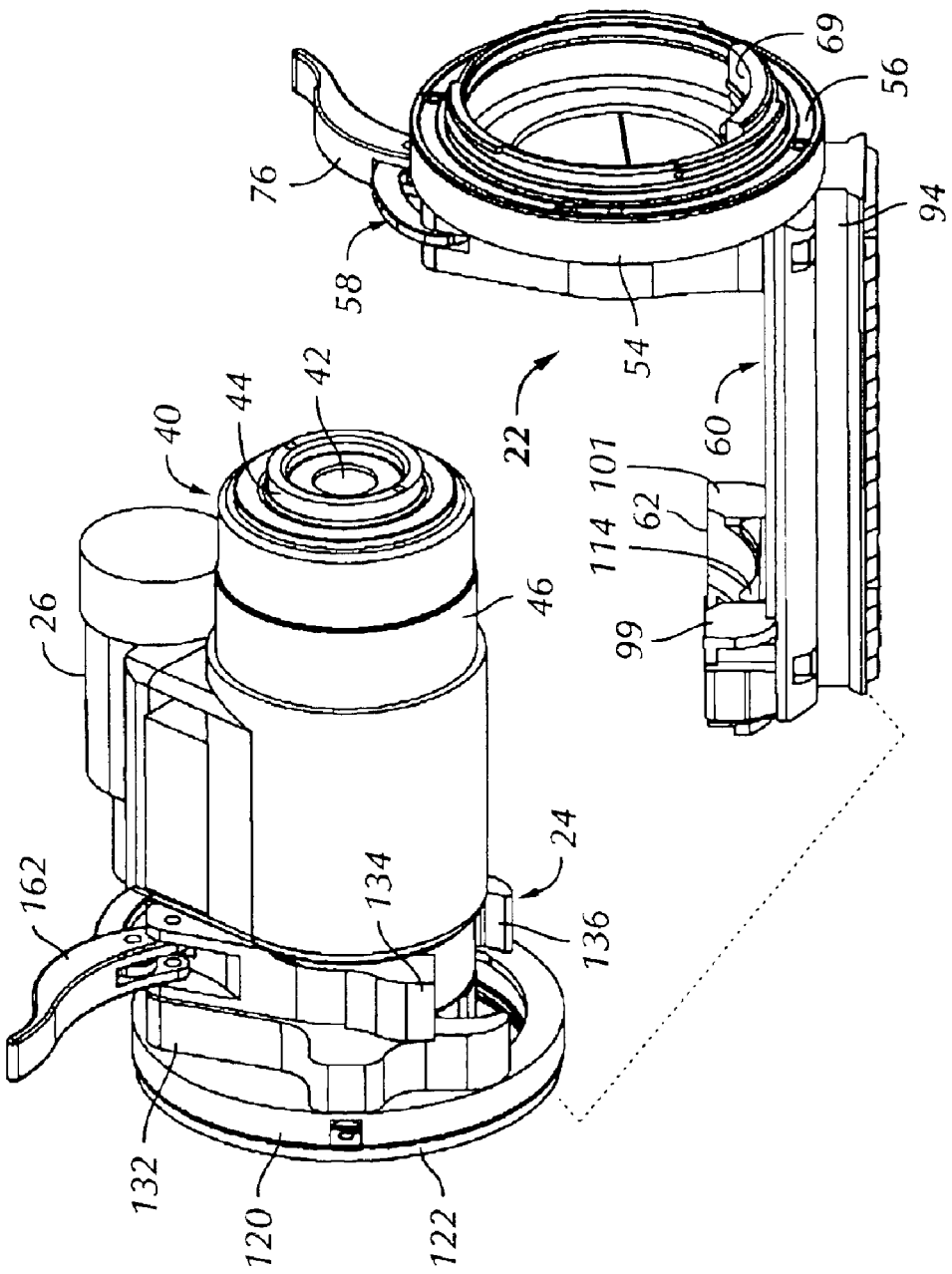
FIG. 7 is a partially exploded rear perspective view of the adaptor assembly with two of the adaptor components mounted together.

An elongate channel 102 is formed in the support base 90 for receiving one or more wires 104 that extend between the rear electrical connector module 69 and a front electrical connector module 106. The cover 92 includes rear and front tray openings 108 and 112, respectively, and rear and front tray tabs 110 and 114, respectively, adjacent the rear and front openings. When assembled, the rear and front openings allow passage of the one or more wires 104 and receive a portion of the rear and front connector modules 69 and 106. As shown in FIG. 6, the rear tray tab 110 is preferably sized and shaped to fit between the lower mounting legs 95 and 97 of the clamping device 58. Likewise, as shown in FIG. 7, the front tray tab 114 is preferably sized and shaped to fit between lower mounting legs 99 and 101 of the front clamp lower segment 62.

Figure 11:
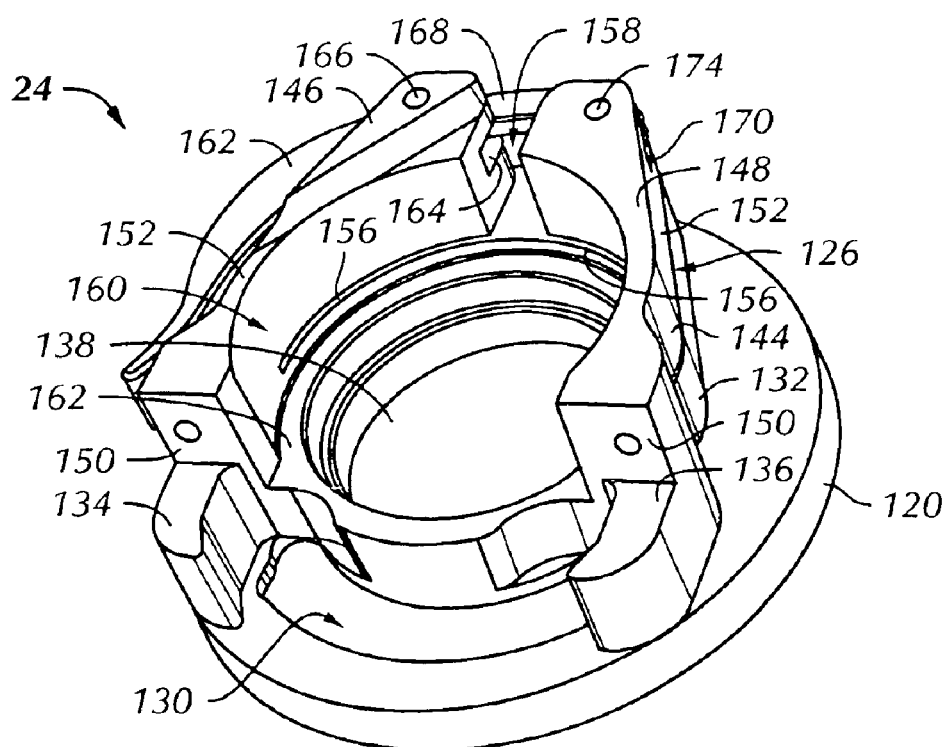
FIG. 11 is an enlarged rear perspective view of a front clamp assembly that forms part of the optical viewing system of FIG. 1.

Turning now to FIGS. 9 and 11, the front clamping portion 24 includes a front support ring 120, a front mounting ring 122 connected to the front support ring for mounting the third image modifying device 16, a front annular spring 124 located between the front mounting ring 122 and the front support ring for reducing play between the third image modifying device and the front clamping portion, and a quick release front clamp assembly 126 connected to the front support ring 120.

The front mounting ring 122 is preferably fastened to the front support ring 120 through threaded screws or the like. It will be appreciated however, that other mounting means can be used. The front mounting ring 122 includes circumferentially spaced tabs 128 that extend radially inwardly to engage with corresponding tabs or supports (not shown) associated with the third image modifying device 16 (FIG. 1), such as the Canon EF 28–105 mm lens or 100–400 mm telephoto lens or the like as previously described. An alignment pin 145 is positioned in the front support ring 120 and extends forwardly thereof in order to align the third image modifying device 16 in the correct orientation.

It will be understood that the front mounting ring 122 may have a wide variety of different configurations to accommodate other mounting means when other image modifying devices are to be used. Such mounting means may include, but are not limited to, external or internal threads, clamps, fasteners, interlocking elements, and so on. It will be appreciated that the front mounting ring 122 and alignment pin 145 may be eliminated or removed, depending on the particular configuration of the third image modifying device 16.

The front electrical connector module 106 (shown in block form) is positioned in an opening 130 of the front support ring 120 for mating with a corresponding connector module (not shown) associated with the third image modifying device 16. The front electrical connector module 106 may include electrical contacts (not shown) in the form of one or more pins, receptacles, contact pads, and so on.

Figure 8:
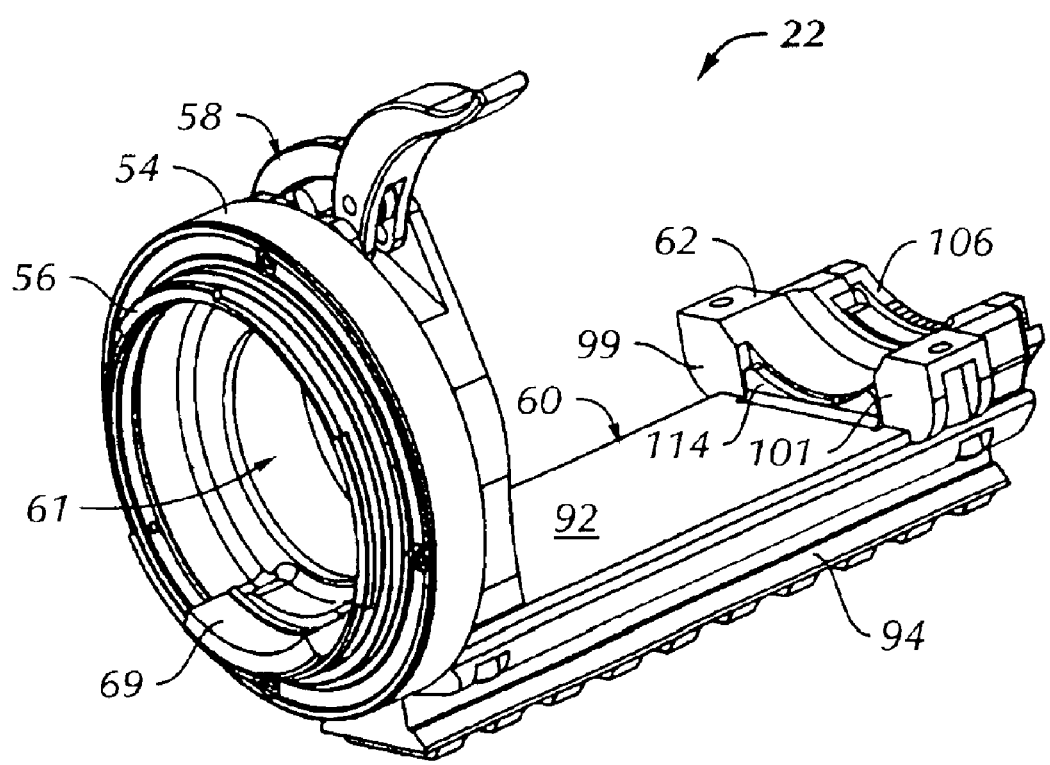
FIG. 8 is a rear perspective view of a rear clamp portion of the adaptor assembly.

When the rear clamping portion 22 is fully assembled, as shown in FIG. 8, the electrical contacts associated with the rear electrical connector module are electrically connected to the electrical contacts associated with the front electrical connector.

The front clamp assembly 126 includes a base member 132 that is preferably integrally formed with, or otherwise securely attached to, the front support ring 120. The base member 132 has spaced, generally hook-shaped mounting legs 134 and 136 and a circular opening 138. The mounting legs 134 and 136 are adapted to receive correspondingly shaped forward extensions 140 and 142, respectively, of the front clamp lower segment 62.

The front clamp assembly 126 also includes a front clamp upper segment 144 with spaced clamping legs 146 and 148. The lower ends 150 of the clamping legs 146 and 148 are preferably integrally formed with, or securely mounted to, the base member 132, and are configured to receive the mounting legs 99 and 101, respectively, of the front clamp lower segment 62. Preferably, the front clamp lower segment 62 is secured to the clamping legs 146 and 148 with bolts 154. The upper ends 152 of the clamping legs 146 and 148 are separated from the base member 132 by a pair of slots 156. A space 158 between the clamping legs 146, 148 accommodates relative leg movement between clamped and unclamped positions. The front clamp upper segment 144 together with the front clamp lower segment 62 define a generally circular opening 160 that receives the front lens adaptor 55 (FIG. 5). Preferably, the diameter of the opening 160 is greater than the diameter of the opening 138 to form a step 162 that abuts the front lens adaptor 55 when assembled.

A locking lever 162 is pivotally connected to the clamping leg 146 in a channel 164. In a preferred arrangement, a roll pin 166 extends through bores formed in the leg 146 and a bore formed in the locking lever 162. A link arm 168 has a first end that is pivotally connected to the leg 148 in a groove 170 and a second end that is pivotally connected to the locking lever 162 in a groove 172 formed in the locking lever. In a preferred arrangement, the link arm first end pivots about a second roll pin 174 that extends through and frictionally engages bores formed in the clamping leg 148. The link arm second end pivots about a third roll pin (not shown) that extends through and frictionally engages bores formed in the locking lever 162. Operation of the front clamp assembly 126 is similar to that of the rear clamp assembly 58 and therefore will not be further described.

When the first and second clamping portions are assembled, the first, second and third image modifying devices are mechanically connected together, the second and third image modifying devices are electrically connected together, and the first image modifying device is electrically isolated from the second and third image modifying devices. By way of example, when the first image modifying device 26 is in the form of a self-powered night vision monocular, the second image modifying device 14 is in the form of an electrically-operated camera, such as the Canon D60 EOS or the like, and the third image modifying device is in the form of an electrically-operated objective lens, such as the Canon EF 28–105 mm lens or 100–400 mm telephoto lens or the like, as shown in FIG. 1, the camera and lens are in electrical communication with each other while the night vision monocular, is electrically isolated from the camera and lens. In this manner, full electrical communication between the lens and the camera is enabled, as if they were directly connected together.

Moreover, since the first image modifying device 26 is self-powered, it may be separated from one or more of the second and third image modifying devices and/or used in other configurations, as described below. This feature is especially advantageous since the night vision monocular can be used separately and independently of the camera and lens. The front and rear quick-release clamp assemblies are also advantageous since they permit quick alignment and clamping together of various image modifying devices, as well as their quick release from each other.

With reference now to FIG. 12, an optical viewing system 180 in accordance with a further embodiment of the invention is illustrated. The optical viewing system 180 is a stand-alone night vision viewing and surveillance device and includes the night vision monocular 26, an eyepiece 52 connected to a rear end of the monocular, an objective lens 21, and a front clamping portion 24 connecting the objective lens to the monocular. The objective lens 21 is of well-known construction and can come in various magnification values or ranges.

In order construct the optical viewing system 180, the camera 18 (FIG. 1) and the rear clamping portion 22 are removed (with or without the camera attached) from the relay lens assembly 40 by lifting up on the rear locking lever 76, as shown in FIG. 7, and then separating the rear clamping portion 22 from the front clamping portion 24 by removing the screws 154 (FIG. 9). The relay lens assembly 40 can then be unscrewed from the monocular housing 28 and replaced with the eyepiece 52 in the same manner. The eyepiece is of well-known construction and may include an adjusting ring 182 (FIG. 12) for adjusting the focus and a flexible eye cup 184 for shielding the viewer's eye from unwanted external light. With this arrangement, the optical viewing system can be quickly and conveniently converted from a highly magnified night vision recording device to a highly magnified night vision viewing device without modification of the various parts.

With reference now to FIG. 13, an optical viewing system 190 can be configured as a stand-alone submersible night vision monocular by replacing the objective lens 21, as shown in FIG. 12, the front clamping portion 24, and the front lens adaptor 55 (FIG. 6) with an underwater lens assembly 192. The underwater lens assembly is of well-known construction and is adapted to screw onto the threaded protrusion 57 (FIGS. 5 and 9) of the monocular housing 28. Thus, when the clamping components of the invention are removed, the night vision monocular can operate as a stand-alone unit, without depending on a camera or the like for its power source as in the prior art discussed above.

Figure 14:
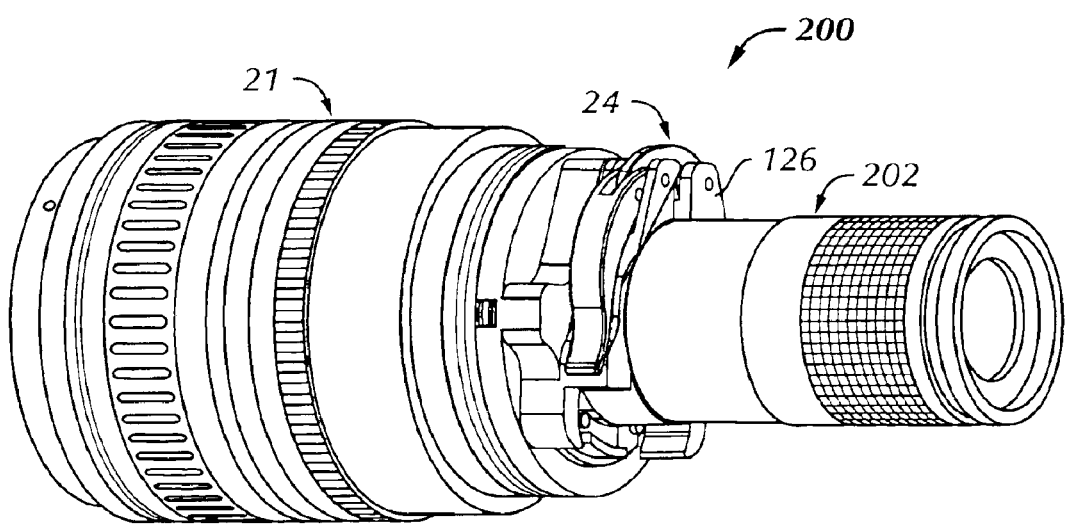
FIG. 14 is a side perspective view of an optical viewing system in accordance with yet a further embodiment of the invention.

With reference now to FIG. 14, an optical viewing system 200 in accordance with a further embodiment of the invention is illustrated. The optical viewing system 200 is a stand-alone day vision viewing and surveillance device and includes the front clamping portion 24, the objective lens 21 connected to the front clamping portion 24 as previously described, and a daylight eyepiece 202 connected to the front clamping portion 24 by way of the front clamp assembly 126 as previously described. With the daylight eyepiece 202 connected behind the lens 21, the assembly functions as a stand-alone magnified daylight spotting scope. The eyepiece 202 is of well-known construction and therefore will not be further described.

It will be appreciated that the present invention enables the quick and easy configuration of may different optical viewing systems and devices using one or more of the clamp assemblies and/or image modifying devices without permanent modification to the various components. In addition, the present invention can be used in combination with one or more of the clamping devices and systems disclosed in U.S. Pat. No. 6,449,419 to Brough et al.

It will be appreciated that terms of orientation and/or position as may be used throughout the specification, such as front, rear, lower, and upwardly, as well as their respective derivatives and equivalent terms, refer to relative, rather than absolute orientations and/or positions.

It will be appreciated by those skilled in the art that changes could be made to the embodiments described above without departing from the broad inventive concept thereof. By way of example, although a particular clamping structure has been shown and described for the front and rear clamping portions, it will be appreciated that other clamping arrangements can be used.

It will be understood, therefore, that this invention is not limited to the particular embodiments disclosed, but it is intended to cover modifications within the spirit and scope of the present invention as defined by the appended claims.

I claim:

1. An adaptor assembly for connecting electrically powered image modifying devices together, the adaptor assembly comprising:
   a first image modifying device;
   a first clamping portion having a first electrical connector for mechanical and electrical connection to a second electrically operated image modifying device;
   a second clamping portion having a second electrical connector for mechanical and electrical connection to a third electrically operated image modifying device, the second clamping portion being adapted for mechanical and electrical connection to the first clamping portion so that the second and third image modifying devices will be in electrical communication when connected to the first and second clamping portions, respectively;
   the first image modifying device being electrically isolated from the first and second electrical connectors;
   at least one of the first and second clamping portions being removably connected to the first image modifying device so that the first image modifying device can be removed from the adaptor assembly and operate as a first independent optical viewing system.

2. An adaptor assembly according to claim 1, wherein the first image modifying device is electrically operated.

3. An adaptor assembly according to claim 2, wherein the first image modifying device comprises an image intensifier and a power source for operating the image intensifier.

4. An adaptor assembly according to claim 3, wherein the first and second clamping portions are removably connected to the first image modifying device.

5. An adaptor assembly according to claim 4, wherein the first clamping portion is connected to a rear portion of the first image modifying device and the second clamping portion is connected to a front portion of the image modifying device.

6. An adaptor assembly according to claim 2, wherein the first image modifying device comprises:
   an image intensifier tube;
   a relay lens assembly positioned rearward of the image intensifier tube; and
   a power source electrically connected to the image intensifier tube, the power source being electrically isolated from the second and third image modifying devices.

7. An adaptor assembly according to claim 6, and further comprising a front lens adaptor positioned forward of the image intensifier tube;
   wherein the first clamping portion is connected to the relay lens assembly and the second clamping portion is connected to the front lens adaptor.

8. An adaptor assembly according to claim 6, and further comprising a hollow tray extending between the first and second clamping portions.

9. An adaptor assembly according to claim 8, and further comprising at least one electrical conductor positioned in the tray and electrically connected to the first and second electrical connectors.

10. An adaptor assembly according to claim 9, wherein the hollow tray is positioned below the first image modifying device.

11. An adaptor assembly according to claim 6, and further comprising an eyepiece adapted for replacing the relay lens assembly rearward of the image intensifier tube so that the first image modifying device is operable as the first independent optical viewing system when the first image modifying device is removed from at least one of the first and second clamping portions.

12. An adaptor assembly according to claim 11, wherein the first and second clamping portions are separable, and further wherein at least the second clamping portion is adapted to receive the eyepiece in place of the first image modifying device so that at least the second clamping portion can operate as a second independent optical viewing system.

13. An adaptor assembly according to claim 1, and further comprising a hollow tray extending between the first and second clamping portions.

14. An adaptor assembly according to claim 13, and further comprising at least one electrical conductor positioned in the tray and electrically connected to the first and second electrical connectors.

15. An adaptor assembly according to claim 14, wherein the hollow tray is positioned below the first image modifying device.

16. An adaptor assembly according to claim 13, and further comprising an accessory mount connected to the hollow tray for mounting a further image modifying device.

17. An optical viewing system comprising:
   a first image modifying device;
   a second image modifying device positioned rearwardly of the first image modifying device;
   a third image modifying device positioned forwardly of the first image modifying device;
   an adaptor assembly comprising:
      a first clamping portion connected to the second image modifying device;
      a second clamping portion connected to the first clamping portion and to the third image modifying device so that the first image modifying device is clamped between the second and third image modifying devices;
   wherein at least one of the first and second clamping portions are removably connected to the first image modifying device so that the first image modifying device can be removed from the adaptor assembly and operate as a further independent optical viewing system.

18. An optical viewing system according to claim 17, wherein the first image modifying device comprises:
   an image intensifier tube;
   a relay lens assembly positioned rearward of the image intensifier tube; and
   a power source electrically connected to the image intensifier tube, the power source being electrically isolated from the second and third image modifying devices.

19. An optical viewing system according to claim 18, wherein the second and third image modifying devices comprise an electrically operated image recording device and an electrically operated objective lens that is mechanically and electrically connectable to the image recording device when the adaptor assembly is removed.

20. An optical viewing system according to claim 19, and further comprising:
   a first electrical connector associated with the first clamping portion and electrically connected to the image recording device;
   a second electrical connector associated with the second clamping portion and electrically connected to the objective lens; and
   at least one electrical conductor electrically connected to the first and second electrical connectors to thereby transfer electrical signals between the image recording device and the objective lens independent of the presence or absence of the first image modifying device.

21. An optical viewing system according to claim 20, and further comprising a hollow tray extending between the first and second clamping portions, with the at least one electrical conductor positioned in the hollow tray.

22. An optical viewing system according to claim 21, and further comprising:
   a first electrical connector associated with the first clamping portion;
   a second electrical connector associated with the second clamping portion; and
   at least one electrical conductor positioned in the tray and electrically connected to the first and second electrical connectors.

23. An optical viewing system according to claim 22, and further comprising an eyepiece adapted for replacing the relay lens assembly rearward of the image intensifier tube so that the first image modifying device is operable as the further independent optical viewing system when the first image modifying device is removed from at least one of the first and second clamping portions.

24. An optical viewing system according to claim 23, wherein the first and second clamping portions are separable, and further wherein at least the second clamping portion is adapted to receive the eyepiece in place of the first image modifying device so that at least the second clamping portion can operate as a further independent optical viewing system.

25. An optical viewing system according to claim 17, and further comprising a front lens adaptor positioned forward of the image intensifier tube;
   wherein the first clamping portion is connected to the relay lens assembly and the second clamping portion is connected to the front lens adaptor.

* * * * *